United States Patent
Colinet et al.

(10) Patent No.: US 9,470,576 B2
(45) Date of Patent: Oct. 18, 2016

(54) MEASURING SYSTEM HAVING ELECTROMECHANICAL RESONATORS, METHOD FOR MANUFACTURING SUCH A SYSTEM, AND METHOD FOR READING AT LEAST TWO ELECTROMECHANICAL RESONATORS

(75) Inventors: Eric Colinet, Bois-Guillaume (FR); Philippe Andreucci, Moirans (FR); Laurent Duraffourg, Voiron (FR); Sébastien Hentz, Varces Allieres et Risset (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 365 days.

(21) Appl. No.: 14/009,044

(22) PCT Filed: Mar. 29, 2012

(86) PCT No.: PCT/FR2012/050682
§ 371 (c)(1),
(2), (4) Date: Sep. 30, 2013

(87) PCT Pub. No.: WO2012/172204
PCT Pub. Date: Dec. 20, 2012

(65) Prior Publication Data
US 2014/0013848 A1 Jan. 16, 2014

(30) Foreign Application Priority Data
Mar. 31, 2011 (FR) ..................... 11 52774

(51) Int. Cl.
*G01H 13/00* (2006.01)
*G01D 5/02* (2006.01)
*G01D 5/14* (2006.01)

(52) U.S. Cl.
CPC ............... *G01H 13/00* (2013.01); *G01D 5/02* (2013.01); *G01D 5/14* (2013.01)

(58) Field of Classification Search
CPC .......... G01D 5/02; G01D 5/14; G01H 13/00
USPC ...................................................... 73/579
See application file for complete search history.

(56) References Cited

U.S. PATENT DOCUMENTS 2,814,785 A * 11/1957 Burns, Jr. .............. H03H 3/007
333/198
5,537,083 A * 7/1996 Lin ..................... H03H 9/02275
333/186

(Continued)

OTHER PUBLICATIONS

Dagamseh, A.M.K. et al., "Towards High-Resolution Flow Cameras Made of Artificial Hair Flow-Sensors for Flow Pattern Recognition", 2011 IEEE 24th International Conference on Micro Electro Mechanical Systems, pp. 648-651, ( Jan. 1, 2011 ) XP 055012057.

(Continued)

*Primary Examiner* — J M Saint Surin
(74) *Attorney, Agent, or Firm* — Oblon, McClelland, Maier & Neustadt, L.L.P.

(57) ABSTRACT

A measuring system including: at least two electromechanical resonators each having a resonant frequency varying around an offload resonant frequency according to a physical quantity to be measured; at least one reading device connected to inputs of the resonators and configured to supply an excitation signal on the inputs; and a memory in which is recorded, for each resonator, offload resonance information relating to the offload resonant frequency of the resonator. Each reading device is configured to determine the resonant frequency of one or more resonators selected for reading by configuring at least one element of the reading device using the offload resonance information stored for each selected resonator.

19 Claims, 7 Drawing Sheets

(56) References Cited

U.S. PATENT DOCUMENTS

| | | | | |
|---|---|---|---|---|
| 5,856,722 | A * | 1/1999 | Haronian | H03H 9/50 310/309 |
| 8,022,554 | B2 * | 9/2011 | Gupta | B81C 1/0023 257/666 |
| 8,253,514 | B2 * | 8/2012 | Kharrat | H03H 9/525 333/197 |
| 2002/0026224 | A1 | 2/2002 | Thompson et al. | |
| 2004/0058591 | A1 * | 3/2004 | Avazi | H03H 9/02 439/894 |
| 2006/0261703 | A1 * | 11/2006 | Quevy | G01K 7/32 310/315 |
| 2008/0076211 | A1 * | 3/2008 | Casset | B81C 1/0065 438/127 |
| 2009/0199638 | A1 | 8/2009 | Jeffs et al. | |

OTHER PUBLICATIONS

International Search Report Issued Aug. 21, 2012 in PCT/FR12/50682 filed Mar. 29, 2012.

* cited by examiner

MEASURING SYSTEM HAVING ELECTROMECHANICAL RESONATORS, METHOD FOR MANUFACTURING SUCH A SYSTEM, AND METHOD FOR READING AT LEAST TWO ELECTROMECHANICAL RESONATORS

The present invention concerns a measuring system having electromechanical resonators, a method for manufacturing such a system and a method for reading at least two electromechanical resonators.

The invention applies more particularly in the fields of gas sensors and mass spectrometry, and in the field of bolometers.

In the context of the present invention, an electromechanical microsystem (or MEMS, "Micro Electro Mechanical System") is defined as a system using electricity as a source of energy and comprising a mechanical structure the form of which at least partly fulfils a function of sensor and/or actuator, the mechanical structure having micrometric dimensions, that is to say less than 1 millimeter.

An electromechanical nanosystem (or NEMS, "Nano Electro Mechanical System") is similar to a MEMS, except that its mechanical structure has nanometric dimensions, that is to say less than 1 micrometer.

Electromechanical measuring systems usually comprise electromechanical resonators, that is to say devices having a functioning linking a mechanical movement with an electrical functioning. These devices are intended to receive an excitation signal (mechanical or electrical) and to supply in response an output signal (generally electrical), the latter also being dependent on a physical quantity to which the electromechanical resonator is subject. These devices have a transfer function generally comprising a resonance peak for a certain resonant frequency, this resonant frequency varying at the same time as the physical quantity. Hereinafter, off-load resonant frequency will be spoken of in order to designate the resonant frequency presented by the electromechanical resonator in the absence of the physical quantity to be measured.

Electromechanical resonators often used are MEMS resonators or NEMS resonators.

Depending on the application, a network of several hundred or even several thousand NEMS resonators may be necessary.

The patent application published under the number FR 2 942 681 A1 proposes an individual addressing of each NEMS resonator using a suitable interconnection technique. This approach has the advantage of being able to effect an individualised reading of each NEMS resonator, as well as an individualised electronic processing for each structure, and thus making it possible for example to compensate for any manufacturing uncertainties, and to provide better decorrelation of any noise sources affecting the measurement.

However, a NEMS resonator has at least two pins for connection with its reading electronics. Because of this, considering by way of example a thousand NEMS resonators to be interrogated individually, a significant technological problem is posed since it is then necessary to make at least two thousand interconnections. For some applications, for example an application to bolometers based on NEMS resonators or an application to mass spectrometry detection as presented in the article in the journal Nature Nanotechnology: "Towards single-molecule nanomechanical mass spectrometry" published online on 21 Jun. 2009 (DOI: 10.1038/NNANO.2009.152) by Naik et al, it is absolutely essential to have a hyperdense matrix of more than 100,000 NEMS resonators to improve the performance of the system. The problem of interconnection is therefore all the greater for these systems.

Apart from the problem of technological implementation of the interconnections, the problem of producing individual reading electronics for each NEMS resonator is also posed. This is because, if an integration procedure is considered where the electronic layer is positioned under the layer of NEMS resonators and where each NEMS resonator occupies a surface area of 5 μm×5 μm (the characteristic size of a NEMS resonator with its interconnection pins), the reading electronics will have to occupy a surface area of less than 25 $\mu m^2$. With current CMOS technologies, designing electronics capable of ensuring dynamic monitoring of the change in the frequency of the NEMS resonator while fulfilling this surface area constraint is almost impossible.

It may thus be desired to provide an electromechanical measuring system that makes it possible to be free from at least part of the aforementioned problems and constraints.

The subject matter of the invention is therefore a measuring system having electromechanical resonators, comprising:
  at least two electromechanical resonators each having a resonant frequency varying around an offload resonant frequency according to a physical quantity to be measured, each resonator being provided with:
    an input intended to receive an excitation signal,
    an output for supplying an output signal in response to the excitation signal, the output signal having resonance at the resonant frequency of the resonator.
  and each resonator comprising a mechanical structure defining its offload resonant frequency, the mechanical structures of the resonators being different from one another so that the offload resonant frequencies are different from one another,
  at least one reading device connected to the inputs of the resonators and designed to supply an excitation signal on said inputs,
the system further comprises a memory wherein there is recorded, for each resonator, offload resonance information relating to the offload resonant frequency of the resonator, and each reading device is intended to determine the resonant frequency of one or more resonators selected for reading by configuring at least one element of the reading device from the offload resonance information stored for each selected resonator.

By virtue of the invention and by means of a judicious choice of the various offload resonant frequencies, it is possible to interconnect in parallel the outputs of the electromechanical resonators, that is to say to connect together these outputs, while always being cable of distinguishing the output signal particular to each electromechanical resonator. Thus the invention makes it possible to obtain a measuring system with a reduced number of connections.

Optionally, the system further comprises means for adding the output signals into a total output signal.

Optionally, each reading device is designed to determine, from the total output signal, the resonant frequency of a single selected resonator.

Optionally, each reading device is designed to successively determine, from the total output signal, the resonant frequency of several selected resonators.

Optionally, the adding means comprise a node to which the outputs of the resonators are connected.

Optionally, for each resonator, the offload resonance information is a bandwidth extending around the offload resonant frequency, and each reading device comprises at least one auto-oscillation loop comprising a demultiplexer intended to extract, from the total output signal, each of the output signals of the resonators selected for reading, the extraction being performed, for each resonator selected for reading, in the bandwidth particular to this resonator.

Optionally, the offload resonance information particular to each resonator is the offload resonant frequency of this resonator.

Optionally, each reading device is designed to determine the resonant frequency of a single resonator, comprises means for selecting the offload resonant frequency of the resonator selected for reading, and is designed to supply, at the start of reading, a single-frequency excitation signal with a frequency equal to the selected offload resonant frequency.

Optionally, each reading device comprises a controlled phase loop circuit designed to fix, after the start of the reading, the frequency of the excitation signal on the frequency of a resonance peak of the total signal corresponding to the resonator selected for reading and to supply, as the determined resonant frequency, the fixed frequency.

Optionally, each controlled phase loop circuit comprises means for starting the fixing at the selected offload resonant frequency.

Optionally, the system comprises several reading devices intended to simultaneously determine the resonant frequencies of the selected resonators.

Optionally, the system further comprises means for adding the excitation signals supplied by the reading devices, in order to supply a total excitation signal to the inputs of the electromechanical resonators.

Optionally, the electromechanical resonators are MEMS resonators or NEMS resonators.

Optionally, the electromechanical resonators are NEMS resonators etched on the same silicon chip.

A method for manufacturing a system as defined previously is also proposed, comprising, for sizing the electromechanical resonators:
  determining, for each resonator, an expected maximum variation range of its resonant frequency around its offload resonant frequency, and
  choosing mechanical structures of the resonators defining offload resonant frequencies sufficiently separate from one another for the determined intervals not to overlap.

There is also proposed a method for reading at least two electromechanical resonators each comprising a mechanical structure defining an offload resonant frequency, the mechanical structures of the resonators being different from one another so that the offload resonant frequencies are different from one another, and each having a resonant frequency varying around the offload resonant frequency according to a physical quantity to be measured, each resonator being provided with an input intended to receive an excitation signal and an output for supplying an output signal in response to the excitation signal, the output signal having a resonance at the resonant frequency of the electromechanical resonator, the method using a reading device comprising a memory wherein there is recorded, for each resonator, offload resonance information relating to the offload resonant frequency of the resonator, and comprising:
  selecting, from the resonators, one or more resonators to be read,
  recovering, in said memory, the offload resonance information of each resonator selected for reading,
  applying an excitation signal (e) to the resonators and determining the resonant frequency of each resonator selected for reading by configuring at least one element of the reading device from the offload resonance information of this resonator,
  determining, for each selected resonator, the physical quantity from the resonant frequency determined and the offload resonant frequency of the resonator.

Optionally, the method further comprises, before applying the excitation signal to the resonators:
  determining the offload resonant frequencies of the resonators,
  for each resonator, determining the offload resonance information of this resonator from its offload resonant frequency,
  recording the offload resonance information determined in said memory.

The invention will be better understood by means of the following description, given solely by way of example and made with reference to the accompanying drawings, wherein:

FIG. 1 is a simplified diagram of a first electromechanical measuring system implementing the invention, FIG. 2 is as simplified diagram of a network of electromechanical resonators of the system in FIG. 1;

FIG. 3 is a photograph of an electromechanical resonator of the network in FIG. 2, FIG. 4 is a simplified diagram of the connections of the electromechanical resonators in the network in FIG. 2, FIGS. 5 to 14 are graphs illustrating the characteristics of the network of electromechanical resonators in FIG. 2, FIG. 15 is a simplified diagram of a second electromechanical measuring system implementing the invention, FIG. 16 is a simplified diagram of a network of electromechanical resonators that can be used in the system in FIG. 1 or FIG. 15, FIG. 17 is a simplified diagram of a network of electromechanical resonators that can be used in the system in FIG. 1 or FIG. 15, FIG. 18 is a simplified diagram of a third electromechanical measuring system implementing the invention, and FIG. 19 is a simplified diagram of a fourth electromechanical measuring system implementing the invention.

With reference to FIG. 1, an example of an electromechanical measuring system 100 implementing the invention comprises first of all a network of electromechanical resonators $102_1 \ldots 102_N$. In the example described, these are NEMS resonators.

Each NEMS resonator $102_1 \ldots 102_N$ is provided with an excitation input $104_1 \ldots 104_N$ and an output $106_1 \ldots 106_N$. Each NEMS resonator $102_1 \ldots 102_N$ is designed to supply an output signal $s_1 \ldots s_N$ on its output $106_1 \ldots 106_N$ in response to an excitation signal e applied at its excitation input $104_1 \ldots 104_N$. Each NEMS resonator $102_1 \ldots 102_N$ also has a resonant frequency $F_1 \ldots F_N$ varying around an offload resonant frequency $F^*_1 \ldots F^*_N$ according to a physical quantity to be measured. Thus, for each NEMS resonator $102_1 \ldots 102_N$, the output signal $s_1 \ldots s_N$ corresponds to the excitation signal that is applied to it, amplified significantly around the resonant frequency $F_1 \ldots F_N$. The offload resonant frequencies $F^*_1 \ldots F^*_N$ are different from one another. "Different" means that each offload resonant frequency $F^*_1 \ldots F^*_N$ is spaced apart from its lower neighbour by at least 1% of its value. For example, if an electromechanical resonator has an offload resonant frequency $F^*_i$ of 1 MHz, the difference from the previous offload resonant frequency $F^*_{i-1}$ is at least 10 KHz.

The system 100 also comprises a device 108 for adding the output signals $s_1 \ldots s_N$ as a total output signal s.

The system 100 also comprises a device 110 for reading the NEMS resonators $102_1 \ldots 102_N$, designed to selectively determine the resonant frequencies $F_1 \ldots F_N$ of the MEMS $102_1 \ldots 102_N$ from the total output signal s.

In the example described, the reading device 110 is designed to supply the excitation signal e and is connected to all the excitation inputs $104_1 \ldots 104_N$, in order to supply the excitation signal e on all the excitation inputs $104_1 \ldots 104_N$ at the same time.

In the example described, the reading device 110 comprises a controlled phase loop circuit 112 designed to fix the frequency F of the excitation signal e on the frequency of a resonance peak of the total output signal s and to supply the fixed frequency as the determined resonant frequency.

To this end, the controlled phase loop circuit 112 comprises a voltage-controlled oscillator 114 that is controlled by a voltage F and connected to the inputs $104_1 \ldots 104_N$ of the NEMS resonators $102_1 \ldots 102_N$ in order to supply to them the excitation signal e, which is periodic and single-frequency with a frequency corresponding to the voltage F. In the remainder of the description, the voltage F will be the same as the frequency of the excitation signal e.

The controlled phase loop circuit 112 also comprises a phase comparator 116 connected to the adding device 108 in order to receive the total output signal s and designed to determine and supply a phase difference dϕ between the total output signal s and the excitation signal e.

The controlled phase loop circuit 112 also comprises a controller 118 connected to the phase comparator 116 and designed to determine and supply the voltage F to the voltage-controlled oscillator 114 from the phase difference dϕ.

The reading device 110 also comprises a memory 120 wherein there are recorded firstly the offload resonant frequencies $F^*_1 \ldots F^*_N$ of the NEMS resonators $102_1 \ldots 102_N$ and secondly an initial phase difference $d\phi_1 \ldots d\phi_N$ for each NEMS resonator $102_1 \ldots 102_N$.

The reading device 110 also comprises means 122 for selecting each of the offload resonant frequencies $F^*_1 \ldots F^*_N$ recorded and each of the initial phase differences $d\phi_1 \ldots d\phi_N$ recorded.

Furthermore, the controlled phase loop circuit 112 comprises means 124 for starting the fixing at the offload resonant frequency and the initial phase difference, both selected by the means 122.

With reference to FIG. 2, in the example described, the network of NEMS resonators $102_1 \ldots 102_N$ consists of NEMS $102_1 \ldots 102_N$ with capacitive actuation and piezoresistive detection and etched on the same silicon chip 202. The NEMS resonators $102_1 \ldots 102_N$ are for example organised in a matrix of I×J=N NEMS resonators.

With reference to FIG. 3, each NEMS resonator in the network comprises a beam 302 having a first embedded end 304 and a second free end 306. Each NEMS resonator also comprises, close to the embedded end 304, two strain gauges 308, 310 made from piezoresistive material arranged on either side of the beam 302. Each NEMS resonator also comprises two electrodes 312, 314 for actuating the beam 302, arranged on either side of the latter. The purpose of such NEMS resonators is to measure the weight of an ambient gas and are capable of measuring additions of mass of around $10^{-21}$ grams, i.e. 1 zeptogram.

With reference to FIG. 4, the two strain gauges 308, 310 of the NEMS resonators $102_1 \ldots 102_N$ are connected respectively to constant potentials E and −E. In addition, the embedded ends 304 of the beams of the NEMS resonators supply the output signals $s_1 \ldots s_N$ and are all connected by connections to the same node 402 supplying the total output signal s, and thus defining a single information transfer bus. These connections and this node 402 thus form the adding means 108. Moreover, the two electrodes 312, 314 of the NEMS resonators $102_1 \ldots 102_N$ are connected respectively together and receive respectively the excitation signal e and its opposite −e. Once again, this configuration defines a single excitation bus.

In the example described, the beams $301_1 \ldots 302_N$ have lengths $L_1 \ldots L_N$ different from one another, their other geometric characteristics being identical. The offload resonant frequency $F^*_n$ (n=1 ... N) of each NEMS resonator $102_1 \ldots 102_N$ is defined as follows:

$$F^*_n \frac{1}{2\pi} \sqrt{\frac{EI}{\rho s}} \cdot \left(\frac{2.1178}{L_n}\right)^2$$

with $$I = \frac{w^3 e}{12}$$

and $$s = w \cdot e,$$

where E is the Young's modulus of the material constituting the NEMS resonator, "rho" its density, I its moment of inertia of the resonator, s its cross section, w its vibrating width, e its thickness.

Thus the NEMS resonators $102_1 \ldots 102_N$ do indeed have offload resonant frequencies $F^*_1 \ldots F^*_N$ different from one another.

The sizing of the NEMS resonators $102_1 \ldots 102_N$ is achieved by determining, for each NEMS resonator, a maximum resonant frequency variation range expected and choosing mechanical structures (in the example described, beam lengths) defining offload resonant frequencies that are sufficiently different from one another for the ranges determined not to overlap. Additional margins are also preferably taken to take account of possible manufacturing dispersions.

With such a sizing, it becomes possible to suitably separate the information of the NEMS resonators $102_1 \ldots 102_N$ of the network.

FIG. 5 illustrates the offload resonant frequencies according to the beam length.

FIG. 6 illustrates the listening channel width ("channel frequency width"), that is to say the difference between two successive resonant frequencies according to the NEMS resonator in question ("NEMS#").

FIG. 7 illustrates the sensitivity in hertz per zeptogram of each NEMS resonator ("NEMS#"), in the case where the latter are used as mass sensors.

FIG. 8 illustrates the bandwidth for each NEMS resonator ("NEMS#"), the bandwidth being defined by F*/Q, where F* is the offload resonant frequency of the NEMS resonator and Q a quality factor of the NEMS resonator.

FIG. 9 illustrates the Bode diagram of this network of fourteen NEMS resonators, that is to say the spectral magnitude and the spectral phase as a function of the frequency.

Figure 1:
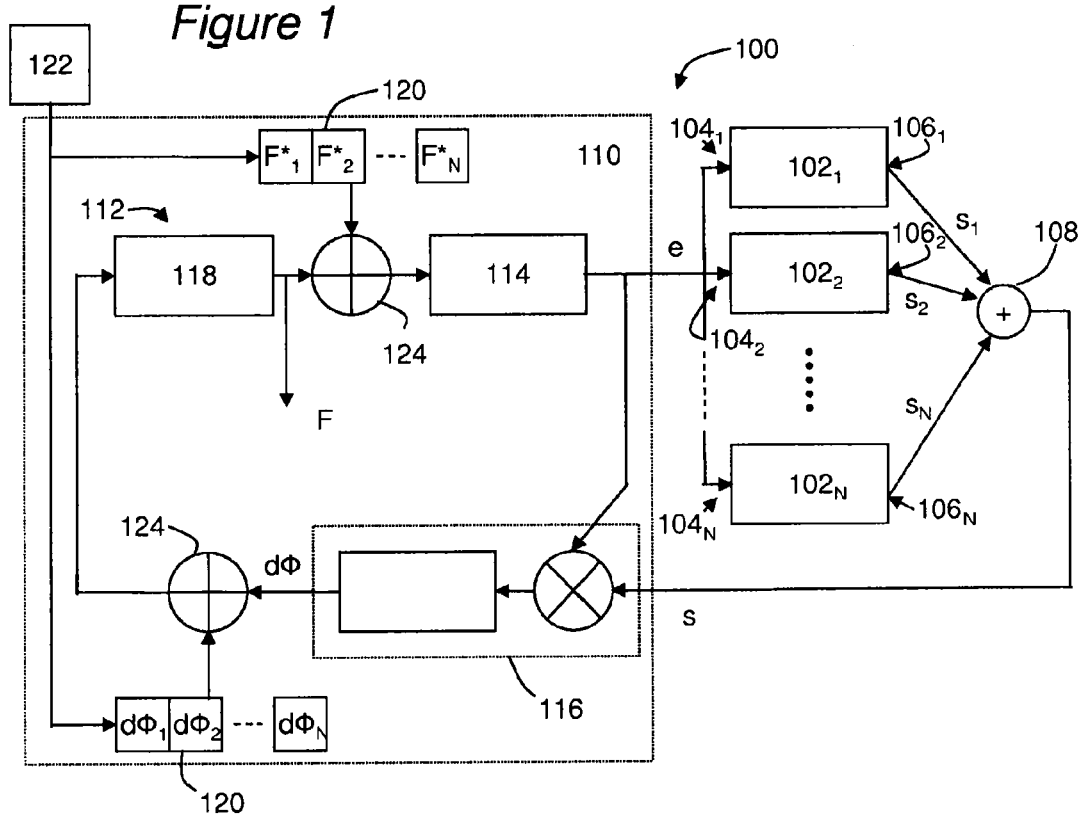
Figure 2:
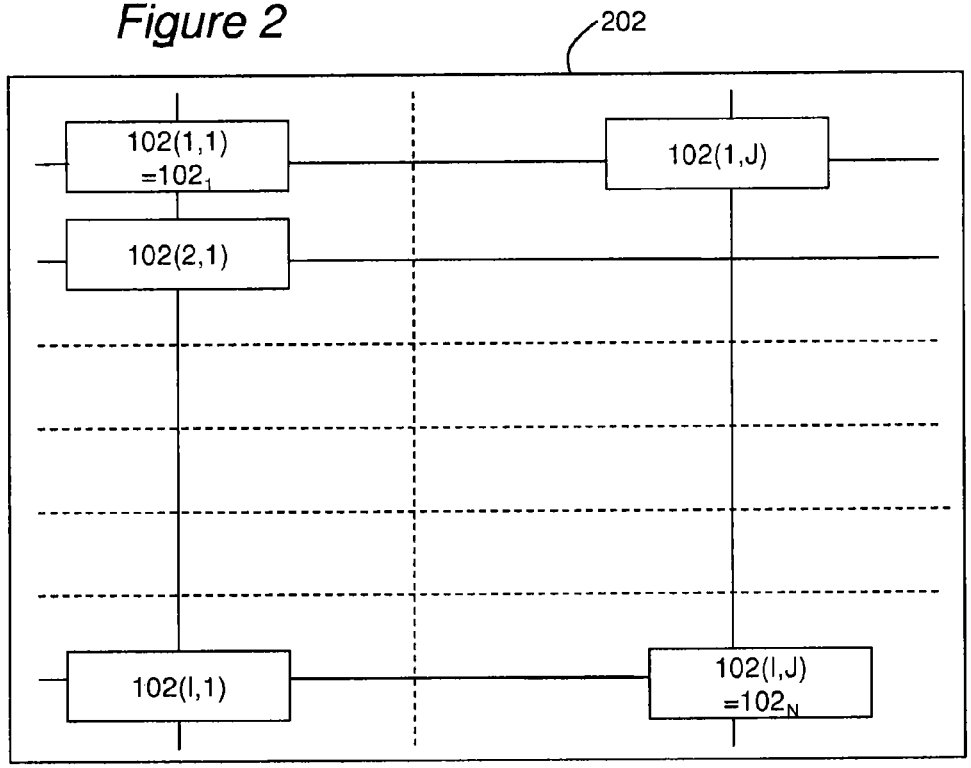

The functioning of the system 100 will now be described.

During a calibration operation, the offload resonant frequencies $F^*_1 \ldots F^*_N$ and the initial phase differences $d\phi_1 \ldots d\phi_N$ are determined for example by sweeping in open loop the space of the frequencies with the voltage-controlled oscillator 114. These data are then recorded in the memory 120.

In functioning, during an operation of reading the NEMS resonator $102_n$, the selection means 122 select the offload resonant frequency $F^*_N$ and the initial phase difference $d\phi_N$ corresponding to the NEMS resonator $102_n$ the reading of which is required. The start means 124 then inject these values into the controlled phase loop 112, so as to attach the controlled phase loop 112 to the resonant frequency of the NEMS resonator $102_n$. Thus, after a fixing time of generally around 50 μs, the fixed frequency F corresponds to the resonant frequency of the NEMS resonator $102_N$.

The reading operation is then repeated for the other NEMS resonators, which makes it possible to read them all one by one.

Subsequently, the physical quantity the measurement of which is sought by the reading of the electromechanical resonator is determined from the resonant frequency and the offload resonant frequency of the electromechanical resonator, for example from the difference between its resonant frequency and its offload resonant frequency.

Figure 15:
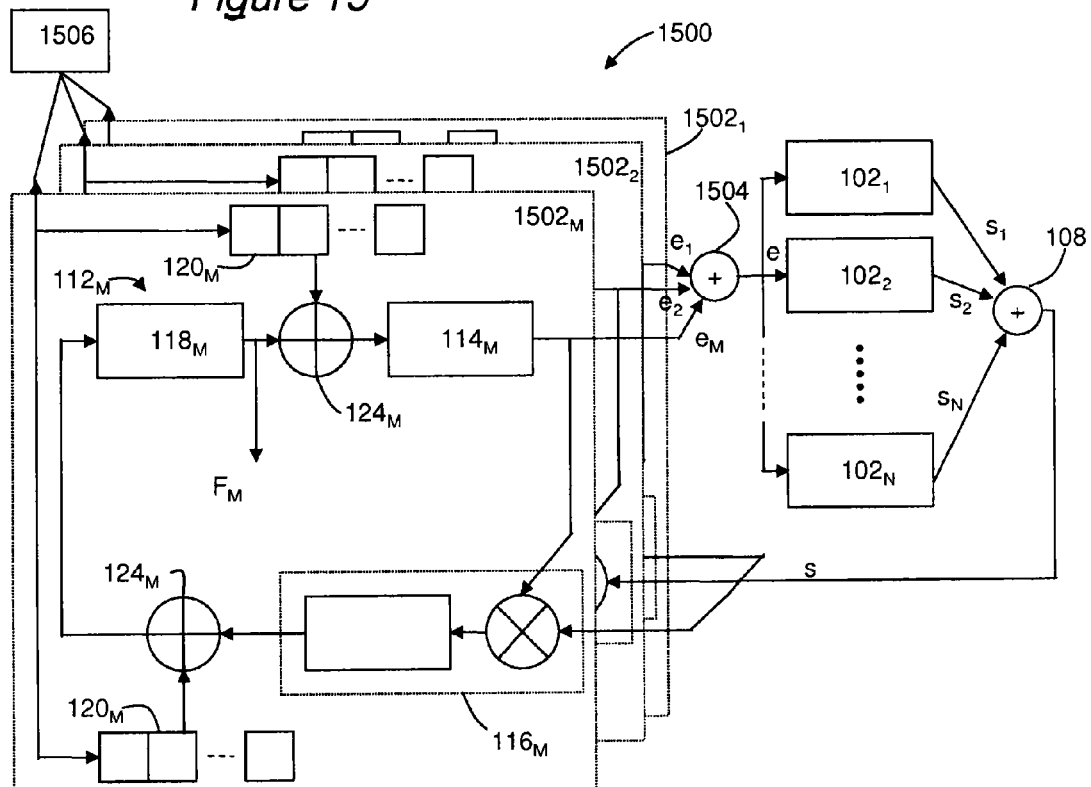

With reference to FIG. 15, a second example of an electromechanical measuring system 1500 implementing the invention differs from that of FIG. 1 in particular through the fact that it comprises several reading devices $1502_1 \ldots 1502_M$, each identical to the reading device 110 in FIG. 1 and designed to supply a respective excitation signal $e_1 \ldots e_M$. The elements of each reading device $1502_1 \ldots 1502_M$ bear the same references as the reading device 110, with in addition an index 1 . . . M indicating the reading device $1502_1 \ldots 1502_M$ to which they belong.

The system 1500 also comprises means 1504 for adding the excitation signals $e_1 \ldots e_M$ designed to supply a total excitation signal e applied to the inputs $104_1 \ldots 104_N$ of the NEMS resonators $102_1 \ldots 102_N$. Thus the excitation signal $e_1 \ldots e_M$ of each reading device $1502_1 \ldots 1502_M$ is applied to the inputs $104_1 \ldots 104_N$ of the MEMS $102_1 \ldots 102_N$.

In addition, the selection means 122 of FIG. 1 are replaced by selection means 1506 designed to select, for each of the reading devices $1502_1 \ldots 1502_M$, each of the offload resonant frequencies $F^*_1 \ldots F^*_N$ recorded and each of the initial phase differences $d\phi_1 \ldots d\phi_N$ recorded, so that each of the means $124_1 \ldots 124_M$ is able to start the fixing at the offload resonant frequency and the initial phase difference selected for the corresponding reading device $1502_1 \ldots 1502_M$.

In FIG. 15, each reading device $1502_1 \ldots 1502_M$ has its memory $120_1 \ldots 120_M$. However, the latter could of course be replaced by a single memory 120, common to all the reading devices $1502_1 \ldots 1502_M$.

It is thus possible to read up to M of the NEMS resonators $102_1 \ldots 102_N$ at the same time.

The functioning of the system 1500 will now be described.

During a calibration operation, the offload resonant frequencies $F^*_1 \ldots F^*_N$ and the initial phase differences $d\phi_1 \ldots d\phi_N$ are determined for example by sweeping in open loop the space of the frequencies with one of the voltage-controlled oscillators $114_m$. These data are then recorded in the memory or memories.

In functioning, during a reading operation, the selection means 1506 select, for each of the M reading devices $1502_1 \ldots 1502_M$, an offload resonant frequency $F^*_n$ and an initial phase difference $d\phi_n$ corresponding to the NEMS resonator $102_n$ the reading of which is required by the reading device in question. The starting means $124_1 \ldots 124_M$ of each reading device $1502_1 \ldots 1502_M$ then inject these values into the corresponding controlled phase loop $112_1 \ldots 112_M$, so as to ensure the attachment of the controlled phase loop $112_1 \ldots 112_M$ to the resonant frequency of the NEMS resonator $102_n$.

The adding means 1504 then supply the excitation signal e, so that each NEMS resonator $102_1 \ldots 102_N$ each receives excitation signals $e_1 \ldots e_M$. Thus each of the NEMS resonators the resonant frequency of which is close to the frequency of one of the excitation signals $e_1 \ldots e_M$ supplies a significant output signal, the output signals of the other NEMS resonators being insignificant.

Thus, after a fixing time generally of around 50 μs, the fixed frequencies $F_1 \ldots F_M$ of the reading devices $1502_1 \ldots 1502_M$ correspond to the resonant frequencies of the NEMS resonators the reading of which is required, that is to say those where the offload resonant frequency $F^*_N$ and the initial phase difference $d\phi_N$ were selected by the means 1504.

Thus several NEMS resonators are read at the same time.

The reading operation is then repeated for other NEMS resonators of the network, which makes it possible to read all of them by groups of M.

Subsequently the physical quantity is determined from the resonant frequency and the offload resonant frequency of each electromechanical resonator read, for example from the difference between the resonant frequency and the offload resonant frequency.

Figure 16:
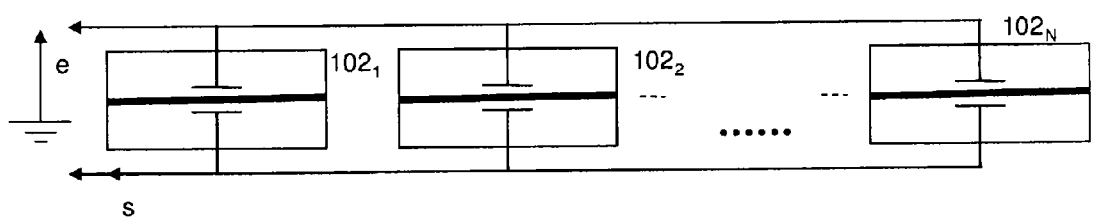

With reference to FIG. 16, in a variant embodiment, the NEMS resonators $102_1 \ldots 102_N$ with capacitive actuation and piezoresistive detection may be replaced by NEMS resonators with capacitive actuation and capacitive detection. Each of the NEMS resonators comprises a capacitor having two electrodes (referred to respectively as the high electrode and the low electrode) and a beam placed between the electrodes and maintained at a continuous potential. The high electrodes are connected together and the low electrodes are connected together. The excitation signal e is the voltage applied to the high electrodes, while the output signal s is the induced current.

Figure 17:
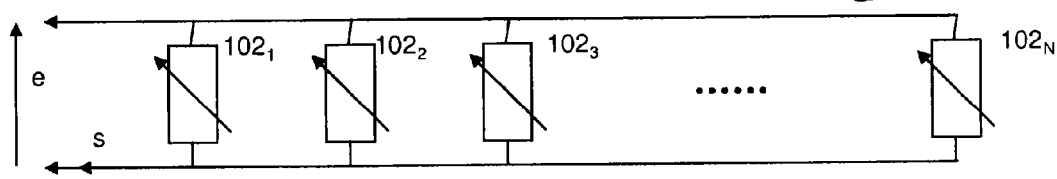

With reference to FIG. 17, in a variant embodiment, the NEMS resonators $102_1 \ldots 102_N$ with capacitive actuation and piezoresistive detection may be replaced by NEMS resonators with thermoelastic actuation and piezoresistive detection. In this case, each NEMS resonator comprises a variable resistor having two terminals (referred to respectively as the high electrode and the low electrode). The high electrodes are connected together; the low electrodes are connected together. The excitation signal e is the voltage applied between the high and low terminals, while the output signal is the induced current.

Figure 18:
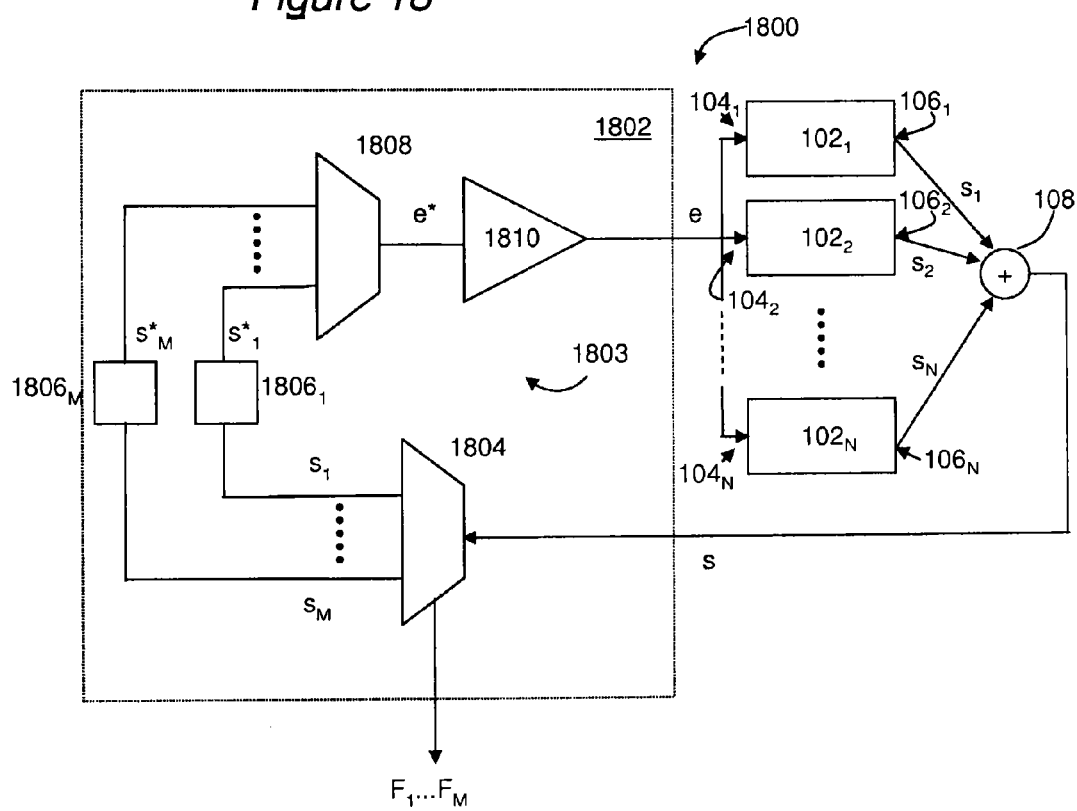

With reference to FIG. 18, a third electromechanical measuring system 1800 implementing the invention differs from the one in FIG. 1 in particular through the fact that the reading device, now numbered 1802, comprises several auto-oscillation loops 1803. The reading device 1802 comprises in particular a demultiplexer 1804 receiving the total output signal s, extracting from the total output signal s a number M of output signals $s_1 \ldots s_M$. The demultiplexer 1804 is also designed to analyse the extracted output signals $s_1 \ldots s_M$ in order to determine their resonant frequencies $F_1 \ldots F_M$. The device comprises control means (not shown) designed to indicate to the demultiplexer 1804 which signals must be extracted, these signals corresponding to the electromechanical resonators the reading of which is required. To enable the extraction of the signals by the demultiplexer, it will for example be possible to use, for each resonator selected for reading, information corresponding to a bandwidth extending around the offload resonant frequency of the resonator in question and recorded in a memory (not shown). The reading device 1802 also comprises M phase shifters $1806_1 \ldots 1806_M$, each designed to dephase a respective extracted output signal $s^*_1 \ldots s^*_M$, in order to obtain a zero input/output phase difference for the corresponding auto-oscillation loop. The reading device 1802 also comprises a multiplexer 1808 designed to add the extracted output signals $s^*_1 \ldots s^*_M$, after they have been dephased, in order to supply an added signal, denoted e*. The reading device 1802 also comprises an amplifier 1810 designed to receive the added signal e* in order to supply the excitation signal e. The excitation signal e and the output signal s thus comprise, after an initial time for putting in auto-oscillation, M frequency peaks corresponding to the resonant frequencies of the M electromechanical resonators being read.

Figure 19:
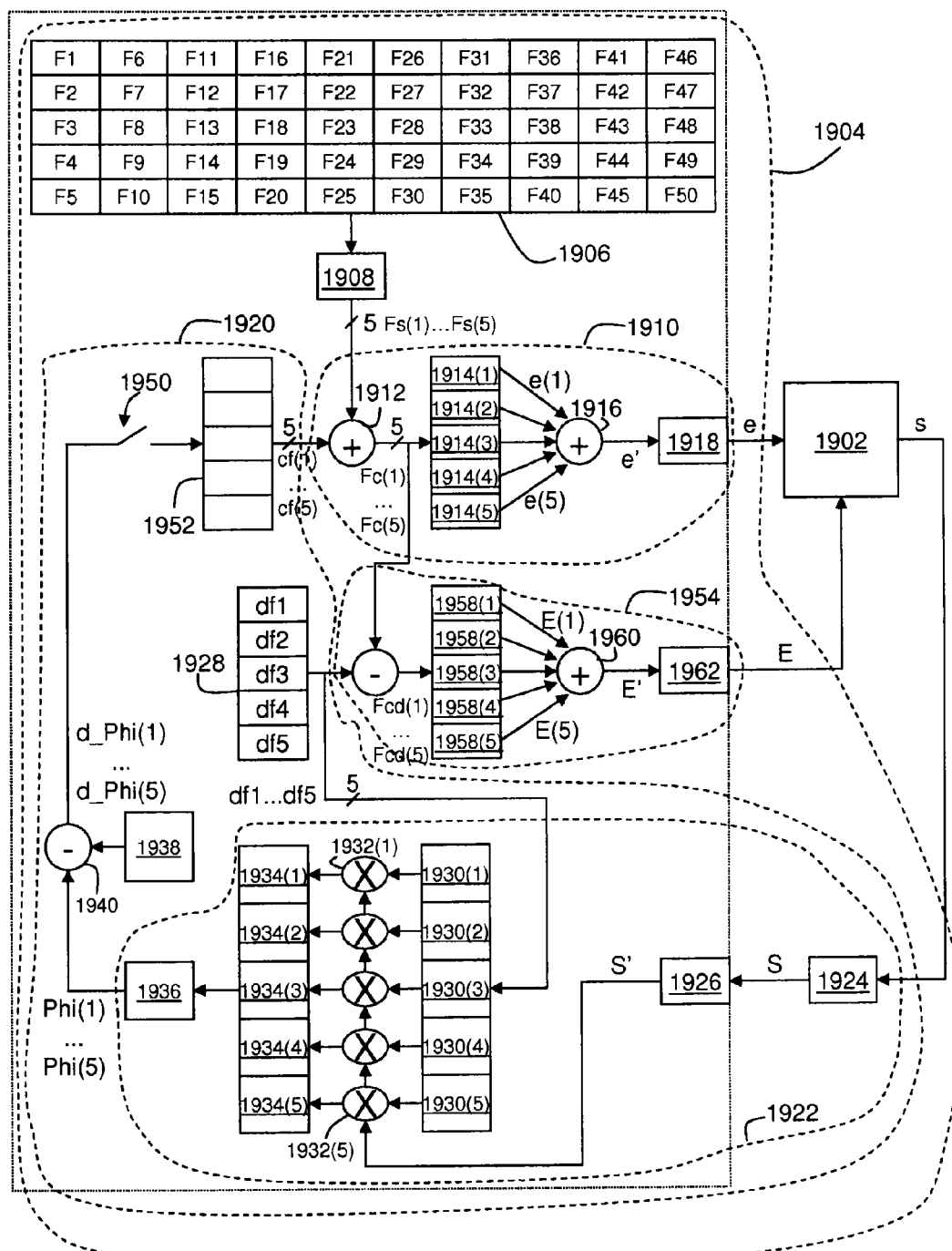

With reference to FIG. 19, a fourth electromechanical measuring system 1900 will now be described. This fourth electromechanical measuring system 1900 has many similarities to that of FIG. 15. In particular, it uses several controlled phase loop circuits for determining the resonant frequencies of the resonators selected for reading starting from their offload resonant frequencies.

Figure 3:
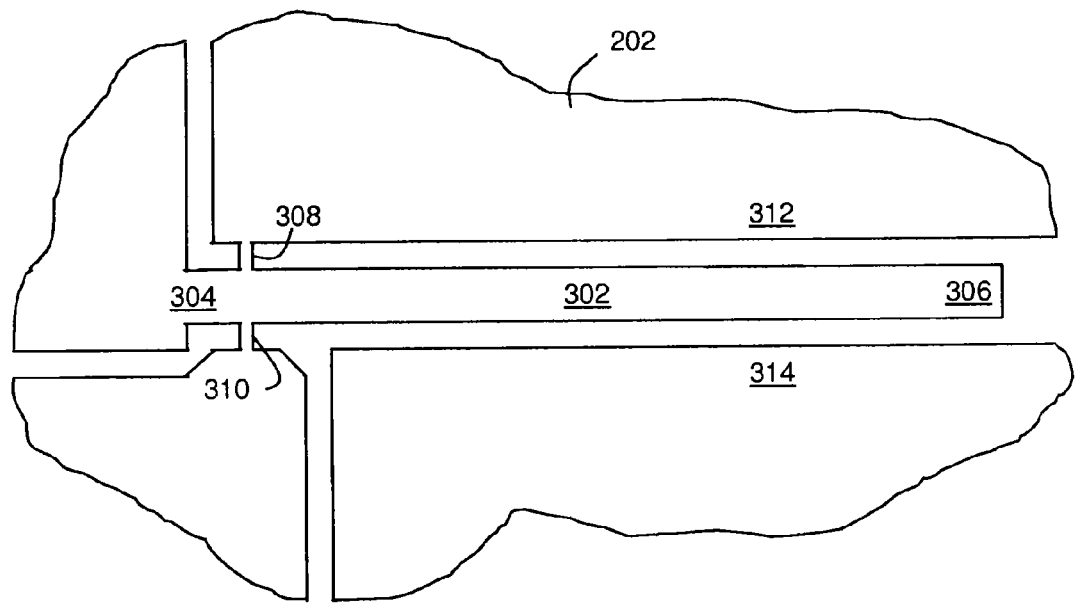
Figure 4:
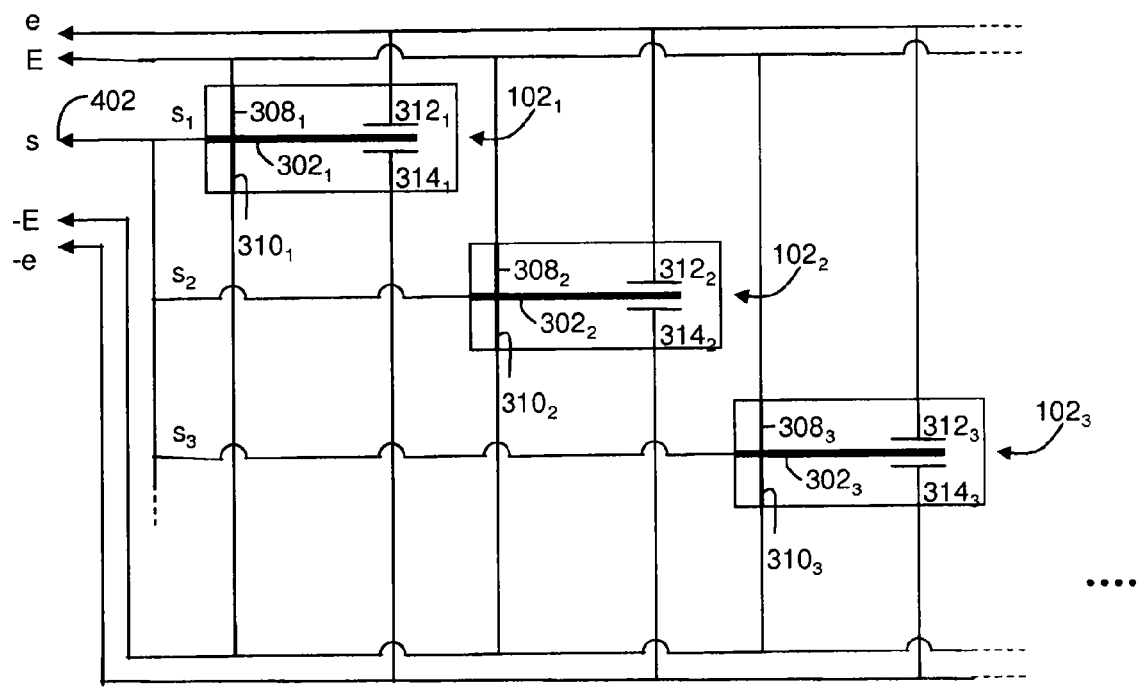
Figure 5:
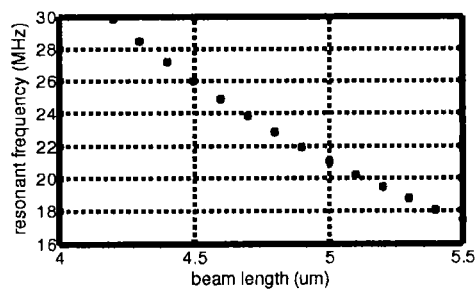
FIGS. 5 to 9 illustrate the case of fourteen NEMS resonators where the length of the beams varies from 4.2 mm to 5.5 µm in steps of 100 nm, and with w=300 nm and e=160 nm.
Figure 6:
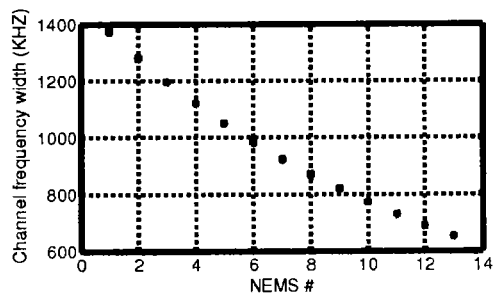
Figure 7:
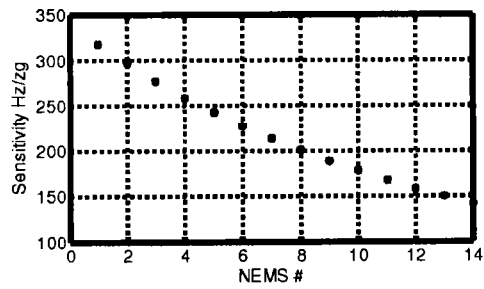
Figure 8:
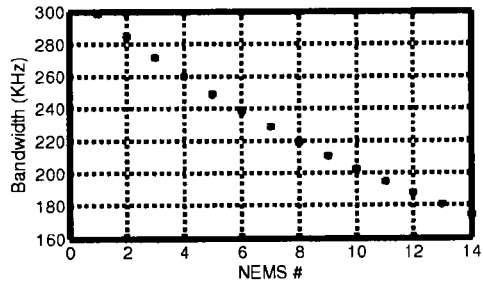
Figure 9:
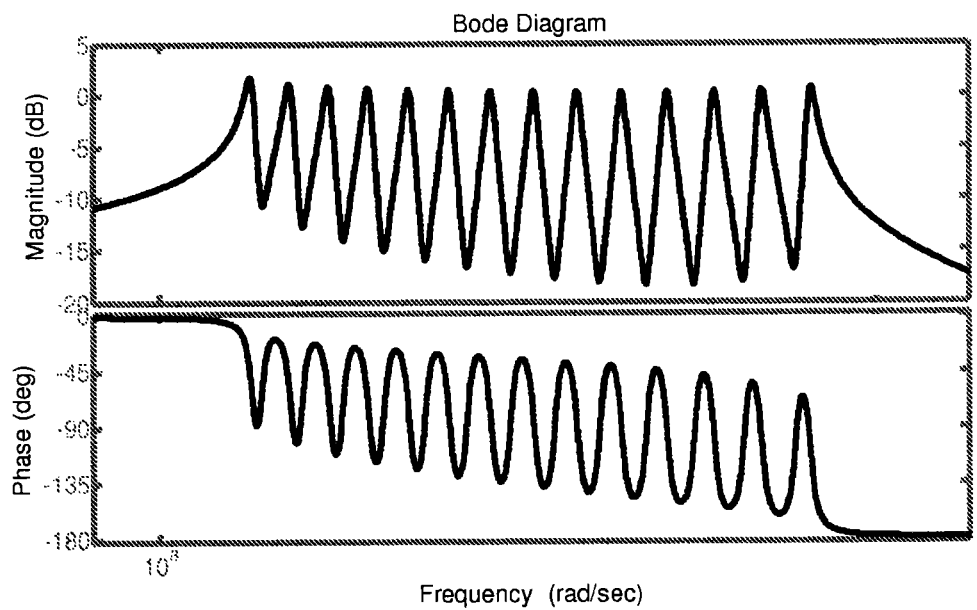
Figure 10:
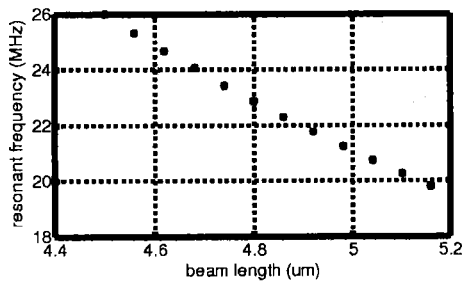
FIGS. 10 to 14 are figures identical to FIGS. 5 to 9 in the case of fourteen NEMS resonators where the length of the beams varies from 4.5 mm to 5.2 μm in steps of 60 nm, and with w=300 nm and e=160 nm.
Figure 11:
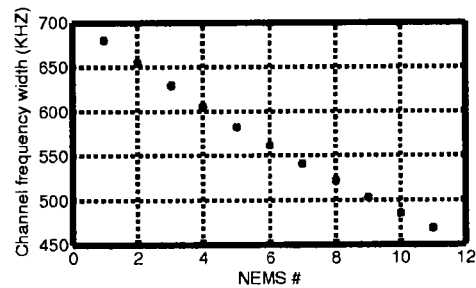
Figure 12:
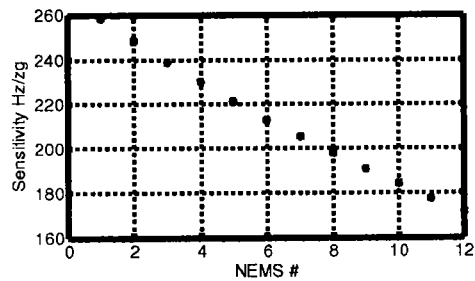
Figure 13:
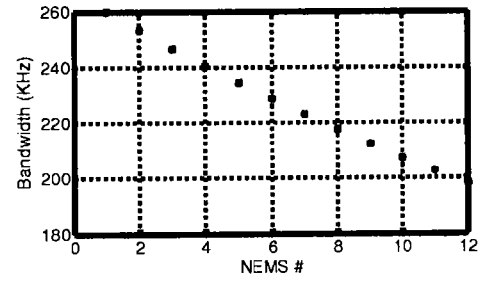
Figure 14:
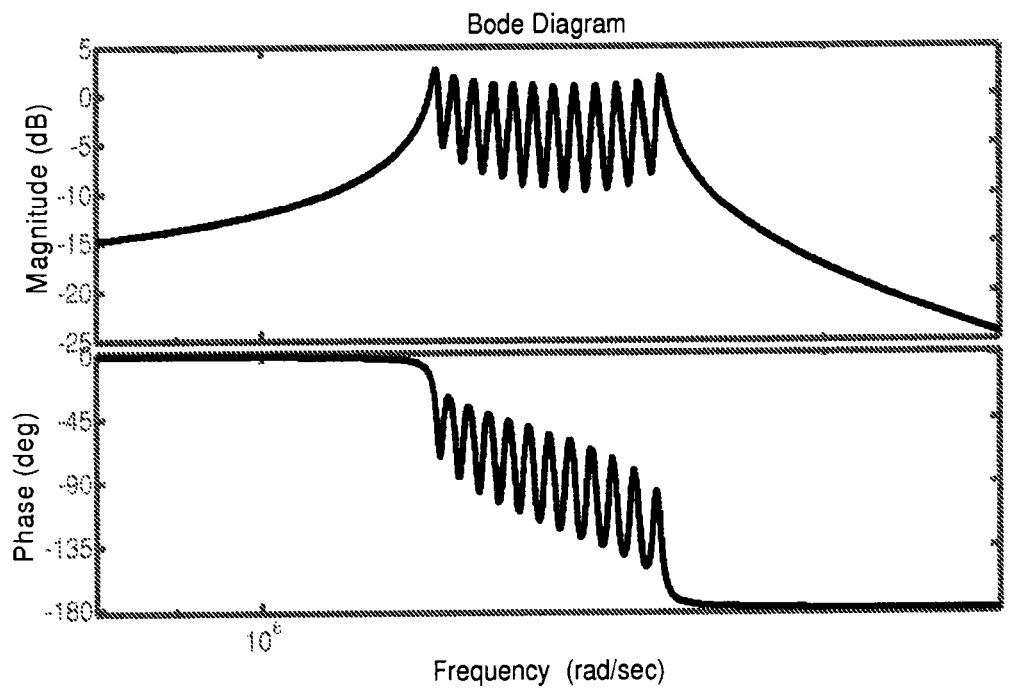

The electromechanical measuring system 1900 comprises first of all a network of electromechanical resonators bearing the general reference 1902. In the example described, the electromechanical resonators 1902 are fifty in number and are similar to those shown in FIGS. 3 and 4. As indicated previously in the description of these figures, the same excitation signal e and the same biasing signal E are applied to each of the resonators 1902. In addition, the outputs—having the local output signals denoted $s_1, s_2, s_3, \ldots$ in FIG. 4—of all the resonators 1902 are connected together to a common output (bearing the reference 402 in FIG. 4) thus having a total output signal s. In the example described, the total output signal s is an analogue voltage.

The electromechanical measuring system 1900 also comprises a reading system 1904 intended to "read" one or more resonators selected from the resonators 1902, that is to say to determine the resonant frequency of this or these resonators. In the example described, the reading system 1904 is intended to read five resonators at the same time, and because of this comprises five controlled phase loop circuits.

The reading system 1904 comprises first of all a memory 1906 wherein the offload resonant frequencies of the resonators 1902 are recorded.

The reading system 1904 also comprises a selection device 1908 intended to select, in the memory 1906, for each resonator that the reading system 1904 is intended to read, the offload resonant frequency of the resonator in question. In the example described, the selected offload resonant frequencies are denoted $Fs(1) \ldots Fs(5)$.

The reading system 1904 also comprises an excitation system 1910 intended to supply the excitation signal e to each of the resonators 1902, and in particular to the resonators the reading of which is required, using firstly the selected offload resonant frequency or frequencies $Fs(1) \ldots Fs(5)$ supplied by the selection device 1908, and secondly one or more frequency corrections, denoted $cf(1) \ldots cf(5)$ and supplied by a system that will be described below. The excitation system 1910 is thus configured from the resonant frequency or frequencies selected.

The excitation system 1910 also comprises a frequency correction device 1912 intended to supply, for each resonator that the reading system 1904 is intended to read, a corrected frequency $fc(1) \ldots fc(5)$ using firstly the offload resonant frequency $Fs(1) \ldots Fs(5)$ supplied by the selection device 1908 and secondly the frequency correction $cf(1) \ldots cf(5)$ for the resonator in question. In the example described, the frequency correction device 1912 is an adder.

The excitation system 1910 also comprises, for each resonator intended to be read by the reading system 1904, a device for generating a single-frequency signal $1914(1) \ldots 1914(5)$ intended to generate a single-frequency excitation signal $e(1) \ldots e(5)$ with a frequency equal to the corrected frequency $fc(1) \ldots fc(5)$ for the resonator in question. In the example described, the single-frequency signal generating devices $1914(1) \ldots 1914(5)$ are digitally controlled oscillators.

The excitation system 1910 also comprises an adder 1916 intended to add the excitation signal or signals $e(1) \ldots e(5)$ supplied by the single-frequency signal generating devices $1914(1) \ldots 1914(5)$ as a digital excitation signal e'.

The excitation system 1910 also comprises a digital to analogue converter 1918 intended to convert the digital excitation signal e' into an analogue excitation e, the latter being supplied to each of the resonators 1902.

The reading system 1904 also comprises a correction system 1920 intended to supply, from the total output signal s, for each resonator intended to be read by the reading system 1904, the frequency correction $cf(1) \ldots cf(5)$ supplied to the frequency correction device 1912.

The correction system 1920 comprises first of all, for each resonator intended to be read by the reading system 1904, a phase-difference determination device 1922 intended to determine, for each resonator intended to be read by the reading system 1904, the phase $Phi(1) \ldots Phi(5)$ of the local output signal (references $s_1, s_2, s_3, \ldots$ in FIG. 4) of the resonator in question.

The phase-difference determination device 1922 comprises first of all a low-noise amplifier 1924 intended to amplify the total output signal s so as to supply an amplified total output signal S.

The phase-difference determination device 1922 also comprises an analogue to digital converter 1926 intended to convert the amplified total output signal S into a digital amplified total output signal S'.

The correction system 1920 also comprises a memory 1928 wherein frequencies $df1 \ldots df5$ are recorded, to a number equal to the number of resonators that the reading system 1904 is intended to read. The frequencies $df1 \ldots df5$ are chosen arbitrarily. However, for correct functioning of the reading system 1904, it is necessary for the difference between the frequencies to be equal to at least ten times the cutoff frequency of the filters 1934 that will be described below. Such a difference makes it possible for example to avoid frequency spectral aliasing in the working frequency band of the filters 1934. For example, if the cutoff frequency of these filters is 1 kHz, it is necessary for the difference to be at least 10 kHz. In the example described, the frequencies recorded lie in the range extending from 10 kHz to 100 kHz.

The phase-difference determination device 1922 also comprises, for each resonator intended to be read by the reading system 1904, a digitally controlled oscillator 1930$(1) \ldots 1930(5)$. These oscillators are intended to receive respective frequencies $df1 \ldots df5$ recorded in the memory 1928 and each to supply two single-frequency signals in quadrature with each other, both at the received frequency df1 . . . df5.

The phase-difference determination device 1922 also comprises, for each resonator that the reading device 1904 is intended to read, a mixer 1932(1) . . . 1932(5) intended to mix the signals in quadrature with the signal S'.

The phase-difference determination device 1922 also comprises, for each resonator that the reading device 1904 is intended to read, a low-pass filter 1934(1) . . . 1934(5) intended to filter the signals supplied by the corresponding mixer 1932(1) . . . 1932(5). Each low-pass filter thus supplies a complex signal representing the output signal of the resonator in question (the output signals are referenced $s_1, s_2, s_3, \ldots$ in FIG. 4).

The phase-difference determination device 1922 also comprises a phase calculation device 1936 intended to determine, for each resonator that the reading device 1904 is intended to read, the phase of the output signal corresponding to this resonator. In the example described, the phase calculation device 1936 is thus intended to supply five phases denoted Phi(1) . . . Phi(5).

The correction system 1920 also comprises a memory 1938 wherein the phases at the offload resonance of each resonator are recorded.

The correction system 1920 also comprises a comparator 1940 intended, for each resonator that the reading device 1904 is intended to read, to compare the phase Phi(1) . . . Phi(5) determined by the phase determination device 1922, with the offload resonance phase recorded in the memory for the resonator in question and to supply the phase difference d_Phi(1) . . . d_Phi(5) resulting from the comparison. In the example described, the comparator 1940 is a subtractor.

The correction system 1920 also comprises a sampler 1950 intended to re-sample the phase differences d_Phi(1) . . . d_Phi(5) supplied in order to reduce the sampling frequency, which simplifies the calculations after the sampler 1950. In the example described the phase differences d_Phi(1) . . . d_Phi(5) are re-sampled at 100 kilohertz. This is because, because of the imprecision of the low-pass filters 1934(1) . . . 1934(5), a higher sampling frequency is not necessary.

The correction system 1920 also comprises, for each resonator that the reading device 1904 is intended to read, a correction filter 1952(1) . . . 1952(5) intended to determine the frequency correction or corrections cf(1) . . . cf(5). In the example described, the correction filters 1952(1) . . . 1952(5) are low-pass filters.

In the embodiment in FIG. 19, the biasing potential of the resonators (denoted E in FIG. 4 and again denoted E in FIG. 19) is this time variable. Thus the reading system 1904 also comprises a biasing system 1954 intended to supply the biasing potential E.

In the example described, the biasing system 1954 is intended to supply the same biasing potential E to all the resonators 1902, from firstly the corrected frequency or frequencies fc(1) . . . fc(5) and secondly the frequencies df1 . . . df5.

The biasing system 1954 comprises first of all a comparator 1956 intended to compare, for each resonator that the reading system 1904 is intended to read, the corrected frequency and the frequency df1 . . . df5 that correspond to the resonator in question and to supply the result of this comparison, referred to as the offset corrected frequency and denoted fcd(1) . . . fcd(5).

The biasing system 1954 also comprises, for each resonator that the reading system 1904 is intended to read, a generator 1958(1) . . . 1958(5) generating a local biasing signal E(1) . . . E(5) having a frequency equal to the offset corrected frequency fcd(1) . . . fcd(5) of the resonator in question.

The biasing system 1954 also comprises an adder 1960 intended to add the local biasing signal or signals E(1) . . . E(5) in order to supply a biasing signal E' in digital form.

The biasing system 1954 also comprises a digital to analogue converter 1962 intended to convert the digital biasing signal E' into an analogue biasing signal E that is applied to each of the resonators 1902.

All the elements described above, with the exception of the resonators 1902 and the low-noise amplifier 1924, are, in the example described, implemented in an in situ programmable gate array (field-programmable gate array or FPGA).

Moreover, it will be noted that the reading system 1904 may be broken down into several reading devices (five in the example described), each intended to read a resonator by supplying the respective excitation signal e(1) . . . e(5), and each comprising a controlled phase loop. For example, the first reading device comprises the following elements: 1924, 1926, 1930(1), 1932(1), 1934(1), 1936, 1938, 1940, 1950, 1952(1), 1906, 1908, 1912, 1914(1), 1928, 1956, 1958(1), 1960 and 1962. In the same way as in the system in FIG. 15, the excitation signals e(1) . . . e(5) are added in the adder 1916 in order to supply the excitation signal e.

An example of functioning of the electromechanical measuring system 1900 for reading five resonators will now be described.

The resonators are stressed so that their resonant frequency is offset from their offload resonant frequency.

The reading system 1904 selects five resonators to read.

The selection device 1908 supplies the five offload resonant frequencies Fs(1) . . . Fs(5) of the five resonators selected.

At the start of the reading, the frequency corrections cf(1) . . . cf(5) are zero. Thus the corrected frequencies fc(1) . . . fc(5) are equal to the offload resonant frequencies Fs(1) . . . Fs(5) and the excitation signal e comprises the five offload resonant frequencies Fs(1) . . . Fs(5) of the five resonators read.

The correction system 1920 determines frequency corrections cf(1) . . . cf(5) so that the corrected frequencies fc(1) . . . fc(5) respectively approach the resonant frequencies of the resonators read.

The excitation system 1910 then supplies a new excitation signal e having the corrected frequencies.

The loop is then once again run through until the corrected frequencies become respectively equal or almost equal to the resonant frequencies of the resonators read. In the example described, this convergence takes less than one millisecond. Thus, after one millisecond, the reading system 1904 selects five new resonators to read. In the example described, all the resonators could therefore be read in 10 milliseconds.

Using offload resonance information (such as the offload resonant frequencies or the bandwidths around the offload resonant frequencies) allows the reading to be accelerated by making it possible to start the search for the resonant frequency where it has the most chance of being situated, that is to say around the offload resonant frequency. This feature therefore has advantages compared with a simple "quasi-continuous" scanning over a wide range of frequencies.

In addition, the embodiments based on a controlled phase loop with "automatic" detection of the phase difference giving the measurement frequency sought are advantageous since they significantly increase the speed of measurement, in particular compared with an open-loop system.

In addition, the use of several reading devices in parallel for putting the readings at various frequencies in parallel also accelerates the reading speed.

It is clear that an electromechanical measuring system such as those described above makes it possible to reduce the number of reading devices necessary, as well as the complexity of the interconnections.

It should also be noted that the invention is not limited to the embodiments described previously. It will be obvious in fact to a person skilled in the art that various modifications can be made to the embodiments described above, in the light of the teaching that has just been disclosed to him.

In particular, electromechanical resonators other than NEMS resonators or MEMS resonators could be used.

In addition, the initialisation of a reading device may be done not at the offload resonant frequency of the electromechanical resonator the reading of which is required, but at a close frequency determined by adding (or subtracting) an adaptation term to the offload frequency of the electromechanical resonator. This adaptation term takes account for example of a drift in the offload resonant frequency over time, or a temperature drift, or, in the case of the example of an electromechanical resonator described in FIG. 3, the presence of an additional mass added to the mass already present.

In addition, the adding means could be implemented by an electronic adding circuit, known per se.

In addition, the adding means could be replaced by a switch receiving as an input all the output signals and supplying as an output, to the reading device or devices, selectively one or more of these output signals corresponding to the electromechanical resonator or resonators the reading of which is required. In the following claims, the terms used must not be interpreted as limiting the claims to the embodiments disclosed in the present description but must be interpreted in order to include therein all the equivalents that the claims aim to cover because of their formulation and the prediction of which is within the scope of a person skilled in the art applying his general knowledge to the implementation of the teaching that has just been disclosed to him.

In addition, although the examples of reading devices described above are closed-loop devices, open-loop reading devices could also be used. In this case also, knowledge of the offload resonant frequencies recorded in a memory would make it possible to perform a more rapid search for the resonant frequency of the resonators.

The invention claimed is:

1. A measuring system, comprising:
    at least two electromechanical resonators, each having a resonant frequency varying around an offload resonant frequency according to a physical quantity to be measured, each resonator including:
        an input configured to receive an excitation signal,
        an output configured to supply an output signal in response to the excitation signal, the output signal having resonance at the resonant frequency of the resonator, and
        a mechanical structure defining the offload resonant frequency, the mechanical structures of the resonators being different from one another so that the offload resonant frequencies are different from one another, all inputs of the resonators being connected together to receive a same excitation signal;
    an adding device for adding the output signals as a total output signal,
    a memory in which is recorded, for each resonator, offload resonance information relating to the offload resonant frequency of the resonator,
    a reading device configured to determine the resonant frequency of one resonator selected for reading,
    wherein the reading device is configured to receive the total output signal,
    wherein the reading device includes a closed-loop configured to supply an excitation signal to the resonators according to the total output signal,
    wherein, for determining the resonant frequency of the selected resonator, the reading device is configured to configure, before reading, at least one element of the closed-loop from the offload resonance information stored for the selected resonator, and
    wherein, for determining the resonant frequency of the selected resonator, the closed-loop with the configured element is configured to attach, after a time, to the resonant frequency of the selected resonator.

2. The system according to claim 1, comprising plural reading devices configured to simultaneously determine the resonant frequencies of selected resonators.

3. The system according to claim 2, further comprising an adding device to add the excitation signals supplied by the reading devices to supply a total excitation signal at the inputs of the electromechanical resonators.

4. The system according to claim 2, wherein each reading device is configured to determine, from the total output signal, the resonant frequency of a single selected resonator.

5. The system according to claim 1, wherein, for each electromechanical resonator, the input and the output are different.

6. The system according to claim 1, wherein each reading device is configured to successively determine, from the total output signal, the resonant frequency of plural selected resonators.

7. The system according to claim 1, wherein the adding device comprises a node to which the outputs of the resonators are connected.

8. The system according to claim 1, wherein, for each resonator, the offload resonance information is a bandwidth extending around the offload resonant frequency, wherein the reading device comprises at least one auto-oscillation loop comprising a demultiplexer configured to extract, from the total output signal, each of the output signals of the resonators selected for reading, the extraction being performed, for each resonator selected for reading, in the bandwidth particular to the resonator selected for reading.

9. The system according to claim 1, wherein the offload resonance information particular to each resonator is the offload resonant frequency of the particular resonator.

10. The system according to claim 9, wherein the reading device is configured to determine the resonant frequency of a single resonator, and select the offload resonant frequency of the resonator selected for reading, and is configured to supply, at a start of reading, a single-frequency excitation signal with a frequency equal to the selected offload resonant frequency.

11. The system according to claim 9, wherein the reading device comprises a controlled phase loop circuit configured to fix, after starting the reading, the frequency of the excitation signal on the frequency of a resonance peak of the total signal corresponding to the resonator selected for reading and to supply the fixed frequency as the determined resonant frequency.

12. The system according to claim 11, wherein the controlled phase loop circuit is configured to start the fixing at the selected offload resonant frequency.

13. The system according to claim 1, wherein the electromechanical resonators are MEMS resonators or NEMS resonators.

14. The system according to claim 13, wherein the electromechanical resonators are NEMS resonators etched on a same silicon chip.

15. A method for sizing electromechanical resonators, the method comprising:
determining, for each resonator, an expected maximum variation range of its resonant frequency around its offload resonant frequency; and
choosing mechanical structures that define offload resonant frequencies of the resonators in a manner such that the offload resonant frequencies are substantially separate from one another in order for the determined ranges to be non-overlapping.

16. A method for reading at least two electromechanical resonators each comprising a mechanical structure defining an offload resonant frequency, the mechanical structures of the resonators being different from one another so that the offload resonant frequencies are different from one another, and each having a resonant frequency varying around the offload resonant frequency according to a physical quantity to be measured, each resonator including an input configured to receive an excitation signal and an output configured to supply, in response to the excitation signal, an output signal, the output signal having a resonance at the resonant frequency of the electromechanical resonator, all inputs of the resonators being connected together to receive a same excitation signal and the output signals being added as a total output signal by an adding device, the method using a reading device comprising a memory
in which is recorded, for each resonator, offload resonance information relating to the offload resonant frequency of the resonator and a closed-loop configured to receive the total output signal and supply an excitation signal to the resonators according to the total output signal, the method comprising:

selecting, from the resonators, one resonator to be read;
recovering from the memory, the offload resonance information of the selected resonator;
applying an excitation signal to the resonators using the closed-loop;
determining the resonant frequency of the selected resonator by configuring, before reading, at least one element of the closed-loop from the offload resonance information stored for the selected resonator, such that the closed-loop with the configured element is configured to attach, after a time, to the resonant frequency of the selected resonator; and
determining the physical quantity from the resonant frequency determined and the offload resonant frequency of the resonator.

17. The method according to claim 16, further comprising, before applying the excitation signal to the resonators:
determining the offload resonant frequencies of the resonators;
determining, for each resonator, the offload resonance information from its offload resonant frequency; and
recording the offload resonance information in the memory.

18. The system according to claim 1,
wherein the reading device includes several closed-loops, each closed-loop being configured to supply an excitation signal to the inputs of the resonators according to the total output signal,
wherein the reading device is configured to determine resonant frequencies of resonators selected for reading, by configuring, before reading, at least one element of each closed-loop from the offload resonance information stored for a respective selected resonator, and
wherein each closed-loop with the configured element is configured to attach, after a time, to the resonant frequency of the respective selected resonator.

19. The system according to claim 1, wherein the reading device is configured to determine, for each selected resonator, the physical quantity from the resonant frequency determined and the offload resonant frequency of the resonator.

* * * * *